US012741544B2

(12) United States Patent
Oko et al.

(10) Patent No.: US 12,741,544 B2
(45) Date of Patent: Sep. 22, 2026

(54) VEHICLE BODY LOWER STRUCTURE

(71) Applicants: Hino Motors, Ltd., Tokyo (JP); TOYOTA JIDOSHA KABUSHIKI KAISHA, Toyota (JP)

(72) Inventors: Akinori Oko, Hino (JP); Mao Kowata, Hino (JP); Shinnosuke Ide, Hino (JP); Yasushi Fukaishi, Hino (JP)

(73) Assignees: Hino Motors, Ltd., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/595,826

(22) Filed: Mar. 5, 2024

(65) Prior Publication Data

US 2024/0300335 A1 Sep. 12, 2024

(30) Foreign Application Priority Data

Mar. 6, 2023 (JP) ................................ 2023-033792

(51) Int. Cl.
*B60L 7/22* (2006.01)
*B60K 15/063* (2006.01)
*B62D 21/02* (2006.01)

(52) U.S. Cl.
CPC .............. *B60L 7/22* (2013.01); *B60K 15/063* (2013.01); *B62D 21/02* (2013.01); *B60K 2015/0636* (2013.01)

(58) Field of Classification Search
CPC .... B60L 7/22; B60K 2015/0636; B62D 21/02
See application file for complete search history.

(56) References Cited

U.S. PATENT DOCUMENTS 9,868,343 B2 * 1/2018 Uranaka .................. B60K 5/10
11,097,752 B2 8/2021 Quindt et al.
11,305,652 B2 * 4/2022 Park .......................... B60L 7/22
11,414,134 B2 * 8/2022 Timofeev ................. B60K 1/00
11,472,308 B2 * 10/2022 Messina ................ H01M 50/20
2007/0144800 A1 * 6/2007 Stone ........................ B60L 7/22 180/65.31
2023/0298785 A1 9/2023 Rahm et al.
2024/0059179 A1 * 2/2024 Levin .................. B60L 15/2045
2024/0097156 A1 * 3/2024 Aslani ..................... B60L 58/33
2024/0149965 A1 * 5/2024 Archer ................. B62D 21/157
2024/0217516 A1 * 7/2024 Sommansson ...... B60L 15/2009

(Continued)

FOREIGN PATENT DOCUMENTS

JP 2007-510397 A 4/2017
WO WO 2005/042283 A1 5/2005

OTHER PUBLICATIONS

Extended European Search Report issued Sep. 23, 2024, in corresponding European Patent Application No. 24161541.8, 7 pages.

*Primary Examiner* — Jeffrey J Restifo
(74) *Attorney, Agent, or Firm* — Oblon, McClelland, Maier & Neustadt, L.L.P.

(57) ABSTRACT

A vehicle body lower structure according to one aspect includes a frame including a side rail extending in a front-rear direction of a vehicle, a motor configured to generate regenerative power, and a brake register configured to convert the regenerative power into thermal energy, in which the brake register is disposed immediately below the side rail so as to receive traveling wind while the vehicle is traveling.

3 Claims, 6 Drawing Sheets

(56) References Cited

U.S. PATENT DOCUMENTS

2024/0300335 A1* 9/2024 Oko .......................... B60L 7/22
2025/0170884 A1* 5/2025 Van Lookeren Campagne ........... H02K 7/102

* cited by examiner 1
2
5
5
10
6
13
RW
RW
3
23
RW
RW
12
6
25b(25)
25b(25)
D1
40c(40)
40c(40)
24
4
6
4
25a(25)
25a(25)
40b(40)
40a(40)
III
III
6
22
FW
FW
21
11
40d(40)
D2

1
25b(25)
25b(25)
40
30b(30)
30b(30)
6
25a(25)
2
5
6
5
40
D1
25a(25)
40
30a(30)
32
31
34
33
30a(30)
D2

1
D1
F
30
33
40
33a
RW
34
25
31
7
32
4
5
S
22
MA
PA
D2

VEHICLE BODY LOWER STRUCTURE

CROSS-REFERENCE TO RELATED APPLICATIONS

This application is based on and claims the benefit of priority from Japanese Patent Application No. 2023-033792 filed on Mar. 6, 2023, the entire contents of which are incorporated herein by reference.

TECHNICAL FIELD

The present disclosure relates to a vehicle body lower structure.

BACKGROUND

In an electric drive vehicle such as a hybrid vehicle, an electric vehicle, or a fuel cell vehicle, regenerative braking that generates power using kinetic energy during deceleration is performed. In this type of electric drive vehicle, a brake register that consumes power generated by regenerative braking may be mounted. Japanese Unexamined Patent Publication No. 2007-510397 describes an agricultural or industrial work vehicle including a frame, an internal combustion engine mounted on the frame, a crankshaft alternator that generates electric energy by driving the internal combustion engine, and a torque tube that protects electrical components. Inside the torque tube, a power electronic unit and a brake register are disposed as electrical components.

SUMMARY

In recent years, various electric devices have been mounted on vehicles along with improvement in vehicle functions. These electric devices are required to perform temperature management so as to operate within a predetermined operating temperature range. However, in the vehicle described in Japanese Unexamined Patent Publication No. 2007-510397, since the power electronic unit and the brake register are provided inside the closed torque tube, heat is accumulated inside the torque tube due to heat generation of the brake register, and the temperature inside the torque tube may exceed an operating temperature range of the power electronic unit. In this case, a malfunction may occur in the power electronic unit. In particular, since a brake register mounted on a large vehicle such as a truck generates a large amount of heat, it is important not to adversely affect an electric device disposed around the brake register.

Therefore, an object of the present disclosure is to suppress an adverse effect on an electric device due to heat generation of a brake register.

A vehicle body lower structure according to one aspect includes a frame including a side rail extending in a front-rear direction of a vehicle, a motor configured to generate regenerative power, and a brake register configured to convert the regenerative power into thermal energy, in which the brake register is disposed immediately below the side rail so as to receive traveling wind while the vehicle is traveling.

In the vehicle structure according to the above aspect, the brake register is disposed immediately below the side rail so as to receive the traveling wind when the vehicle travels. Since the heat generated in the brake register is released to the outside of the vehicle by the traveling wind, it is possible to suppress an increase in an operating temperature of an electric device disposed around the brake register. Therefore, it is possible to suppress an adverse effect on the electric device due to heat generation of the brake register.

According to various aspects of the present disclosure, it is possible to suppress an adverse effect on the electric device due to heat generation of the brake register.

DETAILED DESCRIPTION

[Overview of Embodiments of Present Disclosure]

Figure 1:
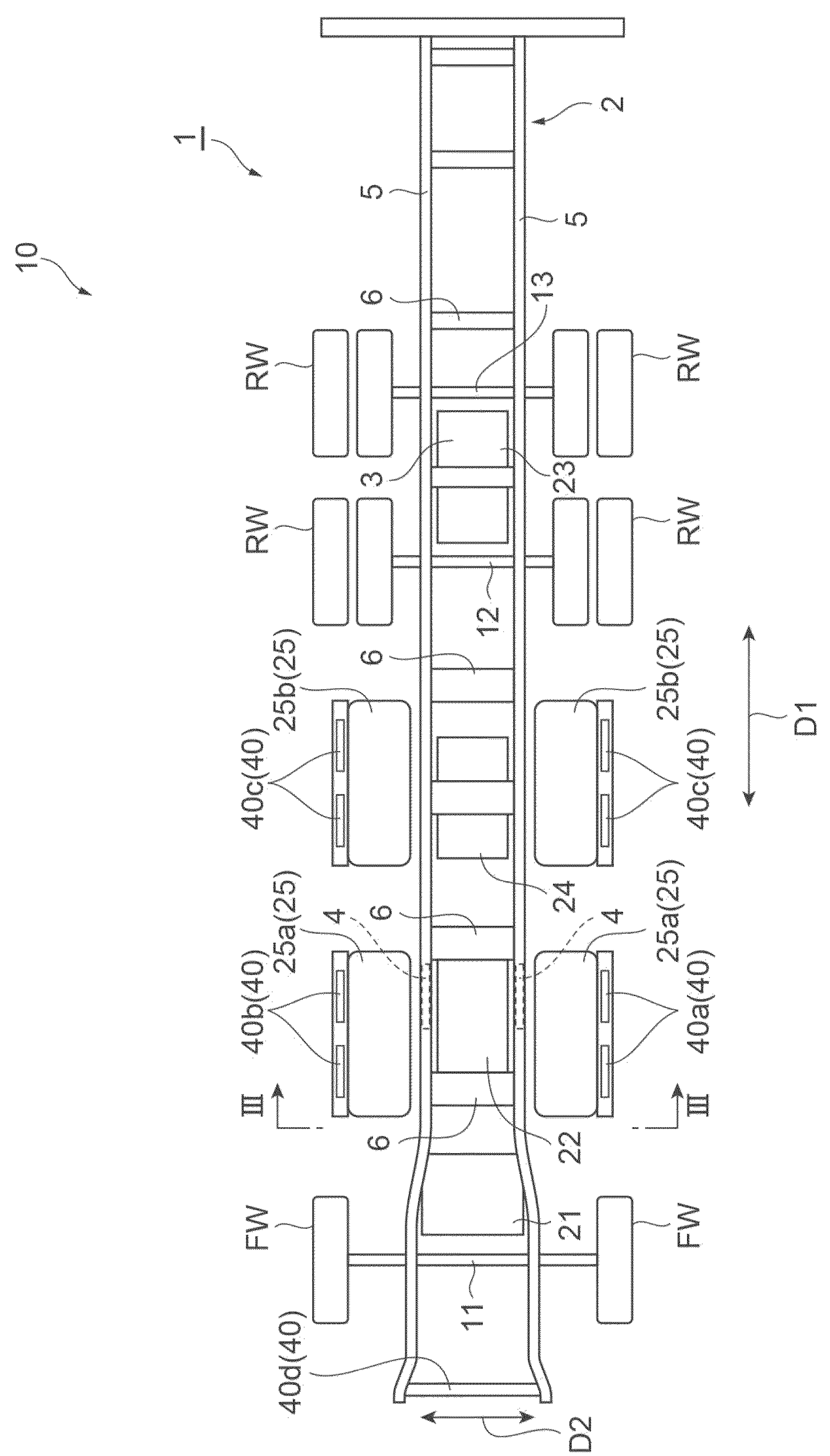
FIG. 1 is a plan view schematically illustrating a vehicle body lower structure according to an embodiment.

First, an overview of embodiments of the present disclosure will be described.

(Clause 1) Provided are: a frame including a side rail extending in a front-rear direction of a vehicle; a motor configured to generate regenerative power; and a brake register configured to convert the regenerative power into thermal energy, in which the brake register is disposed immediately below the side rail so as to receive traveling wind while the vehicle is traveling. In this vehicle body lower structure, the brake register is disposed immediately below the side rail so as to receive the traveling wind when the vehicle travels. Since the heat generated in the brake register is released to the outside of the vehicle by the traveling wind, it is possible to suppress an increase in an operating temperature of an electric device disposed around the brake register. Therefore, it is possible to suppress an adverse effect on the electric device due to heat generation of the brake register.

(Clause 2) The vehicle body lower structure according to Clause 1 may further include a bracket connected to the side rail and holing the brake register in a state of being suspended below the side rail, in which the brake register may be held at a position separated from the side rail via a gap. By forming the gap between the brake register and the side rail, traveling wind passes through the gap during traveling of the vehicle, and heat generated in the brake register is discharged to the outside of the vehicle. Therefore, the temperature around the brake register is less likely to rise, and it is possible to suppress an adverse effect on the electric device due to heat generation of the brake register.

(Clause 3) The vehicle body lower structure according to Clause 1 or 2 may further include a radiator disposed outside the brake register in a vehicle width direction when viewed from above the vehicle, and a refrigerant flow path configured to circulate a refrigerant between the radiator and the brake register. Since the radiator is disposed outside the brake register in the vehicle width direction, a length of the refrigerant flow path between the radiator and the brake register can be shortened. As a result, the cooling efficiency of the brake register can be improved.

(Clause 4) In the vehicle body lower structure according to any one of Clauses 1 to 3, the frame may include a pair of side rails including the side rail, the vehicle body lower structure may further include: a pair of hydrogen tanks disposed in a vehicle width direction outside the pair of side rails; and a pair of protection members configured to respectively protect the pair of hydrogen tanks from external impact, and the brake register may be disposed between the pair of protection members. By disposing the brake register between the pair of protection members, the brake register can be protected from external impact.

[Exemplification of Embodiments of Present Disclosure]

Hereinafter, embodiments of the present disclosure will be described with reference to the drawings. In the description of the drawings, the same elements are denoted by the same reference signs, and redundant description is omitted. The drawings may be partially simplified or exaggerated for easy understanding, and dimensional ratios, angles, and the like are not limited to those described in the drawings.

FIG. 1 is a plan view schematically illustrating a vehicle body lower structure 10 of a vehicle 1 according to an embodiment. The vehicle 1 is a large vehicle such as a truck, a cargo vehicle, or a bus vehicle, and is a fuel cell electric vehicle (FCEV) that generates power by chemically reacting hydrogen and oxygen, and travels by driving a motor with the generated power. Hereinafter, an example in which the vehicle 1 is a truck having a cab and a cargo bed will be described. In the following description, a forward direction and a backward direction of the vehicle 1 are referred to as a front-rear direction D1 of the vehicle 1, and a left-right direction when the vehicle 1 is viewed from the rear is referred to as a vehicle width direction D2.

The vehicle 1 includes a vehicle body lower structure 10 that supports a cab and a cargo bed. As illustrated in FIG. 1, the vehicle body lower structure 10 includes a frame 2, a motor 3, and a pair of brake registers 4. The frame 2 includes a pair of side rails 5 disposed apart from each other in the vehicle width direction D2 of the vehicle 1 and extending in the front-rear direction D1 of the vehicle 1, and a plurality of cross members 6 extending in the vehicle width direction D2 of the vehicle 1 between the pair of side rails 5 and coupled to the pair of side rails 5. The frame 2 is, for example, a ladder frame.

The frame 2 supports a front axle 11, a rear axle 12, and a rear axle 13. The front axle 11 is connected to a pair of left and right front wheels FW. The rear axle 12 is connected to a pair of left and right rear wheels RW. The rear axle 13 is disposed behind the rear axle 12 and is connected to a pair of left and right rear wheels RW. One or both of the rear axle 12 and the rear axle 13 are drive shafts driven by the motor 3. A cab in which a driver's seat of the vehicle 1 is disposed is supported on a front portion of the frame 2. A cargo bed on which a load is mounted is supported on a rear portion of the frame 2.

In an embodiment, the vehicle body lower structure 10 further includes a fuel cell stack 21, a high-voltage device 22, an inverter 23, and a battery 24. The fuel cell stack 21, the high-voltage device 22, the inverter 23, and the battery 24 are electric devices for driving the vehicle 1, and are supported between the pair of side rails 5 of the frame 2.

The fuel cell stack 21 is mounted on a front portion of the frame 2, and is disposed under a floor of the cab of the vehicle 1. The fuel cell stack 21 generates electric power for driving by chemically reacting hydrogen stored in a hydrogen tank 25 described later and oxygen in air. The high-voltage device 22, the inverter 23, and the battery 24 are mounted on the rear portion of the frame 2 and are disposed under the floor of the cargo bed of the vehicle 1.

The high-voltage device 22 is a high-voltage auxiliary device that operates by electric power from the battery 24. In one embodiment, the high-voltage device 22 includes a brake register controller 26 (see FIG. 5). The brake register controller 26 controls electric power supplied to each of the brake registers 4. The high-voltage device 22 may further include a DC-DC converter. The DC-DC converter supplies electric power of the battery 24 to various auxiliary devices mounted on the vehicle 1, for example.

The motor 3 is mounted on the rear portion of the frame 2 and functions as an electric motor and a generator. Specifically, during power running control, the motor 3 receives electric power supply from the battery 24 and generates power for driving the vehicle 1. On the other hand, at the time of regenerative control, the motor 3 generates load torque for regenerative power generation to generate power. The regenerative power generated by the motor 3 is supplied to the battery 24 via the inverter 23.

The inverter 23 is electrically connected to the motor 3 and the battery 24, and controls electric power supplied to the motor 3 and the battery 24. For example, during the power running control, the inverter 23 converts DC power of the battery 24 into AC power and supplies the AC power to the motor 3. On the other hand, at the time of the regenerative control, the inverter 23 converts regenerative power generated by the motor 3 into DC power to charge the battery 24. The battery 24 is a secondary battery such as a lithium ion battery.

Figure 2:
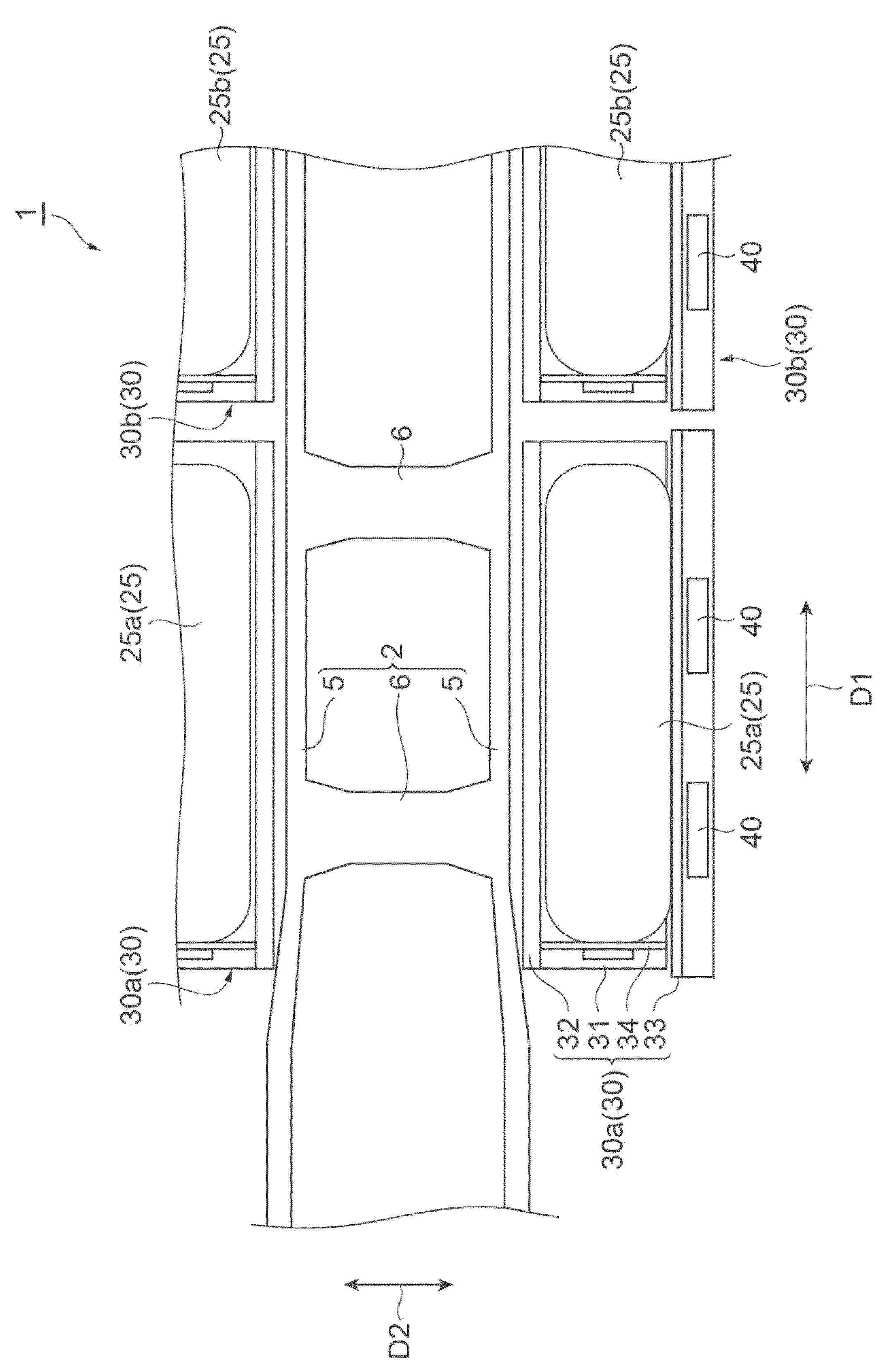
FIG. 2 is an enlarged plan view of a vehicle body lower structure around a hydrogen tank.

In one embodiment, a plurality of hydrogen tanks 25 and a plurality of protection members 30 may be mounted on the frame 2. FIG. 2 is an enlarged plan view of the vehicle body lower structure 10 around each of the hydrogen tanks 25. Note that, in FIG. 2, the electric devices mounted on the frame 2 are omitted. Each of the plurality of hydrogen tanks 25 stores hydrogen gas for power generation. The hydrogen tank 25 has a substantially cylindrical shape extending in an axial direction, and is disposed under the floor of the cargo bed of the vehicle 1 in a state where the axial direction is directed in the front-rear direction D1 of the vehicle 1.

As illustrated in FIG. 1, the plurality of hydrogen tanks 25 includes a pair of hydrogen tanks 25*a* and a pair of hydrogen tanks 25*b*. The pair of hydrogen tanks 25*a* is disposed outside the pair of side rails 5 in the vehicle width direction D2 so as to face each other. The pair of hydrogen tanks 25*b* is disposed behind the pair of hydrogen tanks 25*a* and outside the pair of side rails 5 in the vehicle width direction D2 so as to face each other. In the following description, the hydrogen tanks 25*a* and 25*b* are collectively referred to as a hydrogen tank 25 unless it is particularly necessary to distinguish them. Pipes for supplying stored hydrogen to the fuel cell stack 21 are connected to the plurality of hydrogen tanks 25.

The plurality of protection members 30 are disposed outside the pair of side rails 5 in the vehicle width direction D2, and protect the plurality of hydrogen tanks 25 from external impact. The plurality of protection members 30 include a pair of protection members 30*a* that respectively protect the pair of hydrogen tanks 25*a*, and a pair of protection members 30*b* that respectively protect the pair of hydrogen tanks 25*b*. That is, the pair of protection members 30*b* is disposed behind the pair of protection members 30*a*. In the following description, the protection members 30*a* and 30*b* are collectively referred to as a protection member 30 unless it is particularly necessary to distinguish them.

The plurality of protection members 30 will be described in detail with reference to FIG. 3. The plurality of protection members 30 protect the plurality of hydrogen tanks 25 from external impact, and function as brackets for fixing the plurality of hydrogen tanks 25 to the pair of side rails 5. FIG.

3 is a cross-sectional view taken along line III-III of FIG. 1. As illustrated in FIG. 3, each of the plurality of protection members 30 includes a support portion 31, an inner erecting portion 32, an outer erecting portion 33, and a coupling portion 34. The support portion 31 supports each of the hydrogen tanks 25. The inner erecting portion 32 is erected from the support portion 31 and disposed inside the hydrogen tank 25 in the vehicle width direction D2. The inner erecting portions 32 are fastened to outer surfaces of the pair of side rails 5 by fasteners such as bolts.

The outer erecting portion 33 is erected from the support portion 31 and disposed outside the hydrogen tank 25 in the vehicle width direction D2. That is, the hydrogen tank 25 is disposed between the inner erecting portion 32 and the outer erecting portion 33. The outer erecting portion 33 has a substantially L-shape as viewed in the front-rear direction D1 of the vehicle 1, and a protruding portion 33*a* protruding outward in the vehicle width direction D2 is formed at a lower end of the outer erecting portion 33. The lower end (protruding portion 33*a*) of the outer erecting portion 33 is disposed below a lower end of each of the pair of side rails 5. An upper end of the outer erecting portion 33 is disposed above an upper end of each of the pair of side rails 5.

The coupling portion 34 extends in the vehicle width direction D2 outside the hydrogen tank 25 in the axial direction, and couples an upper portion of the inner erecting portion 32 and an upper portion of the outer erecting portion 33. The coupling portion 34 is disposed at a position overlapping the hydrogen tank 25 as viewed in the front-rear direction D1, and prevents the hydrogen tank 25 from falling off from the protection member 30. The coupling portion 34 has such strength as not to be buckled and deformed when another vehicle collides with the vehicle 1 from a side surface.

Figure 3:
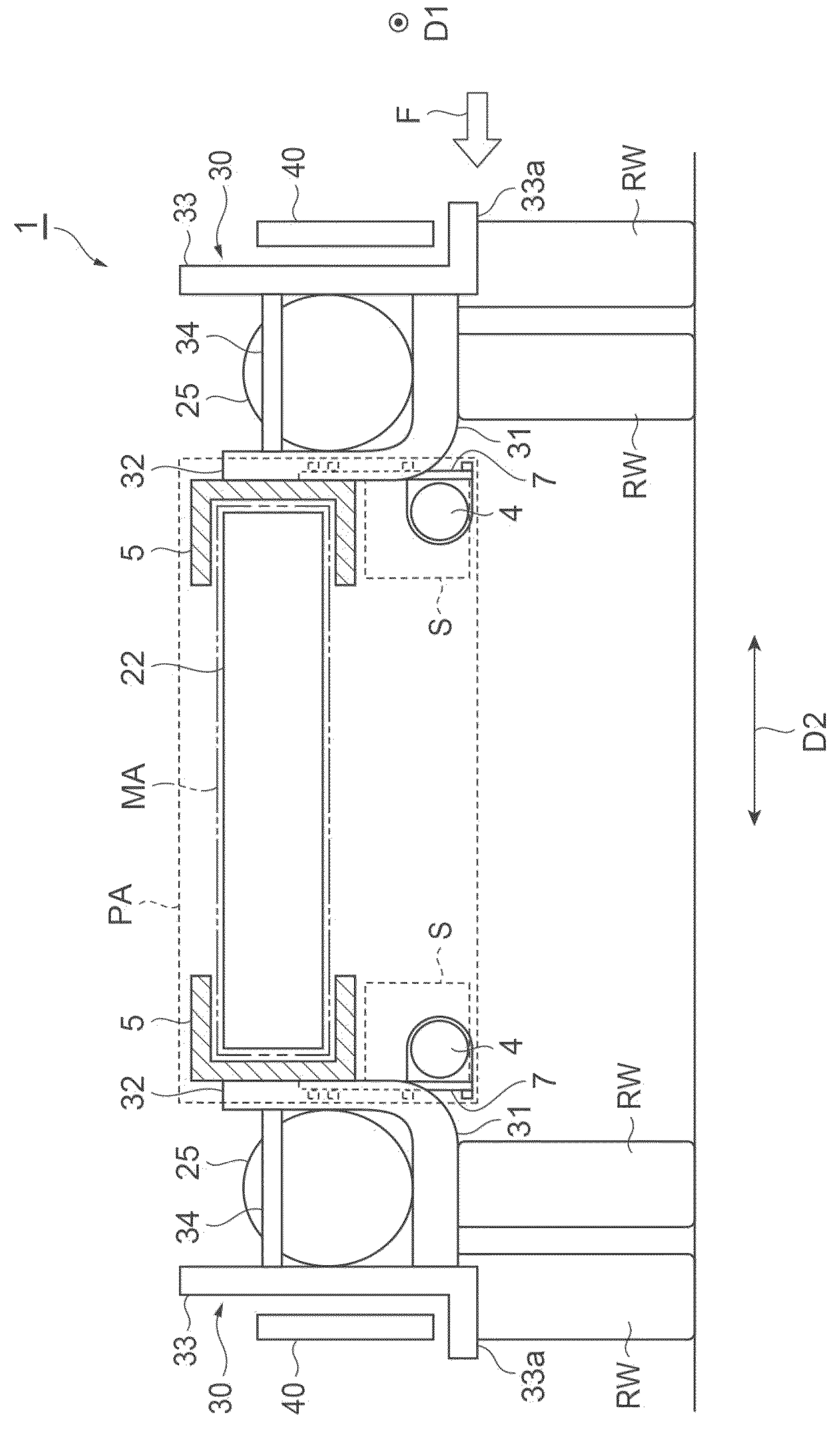
FIG. 3 is a cross-sectional view taken along line III-III of FIG. 1.

As described above, since the lower end of the outer erecting portion 33 protrudes outward in the vehicle width direction D2, when another vehicle collides with the vehicle 1 from the side, an impact F from the outside is applied to the protruding portion 33*a* of the outer erecting portion 33 as illustrated in FIG. 3. The impact F applied to the protruding portion 33*a* is transmitted to the side rail 5 through the support portion 31 and the coupling portion 34. That is, the impact F from the outside is received by the protection member 30, and the impact F is prevented from being directly applied to the hydrogen tank 25. As a result, damage to the hydrogen tank 25 is prevented.

By disposing the pair of protection members 30 outside the pair of side rails 5, as illustrated in FIG. 3, a protection region PA protected from the impact F from the side is formed between the pair of protection members 30. As illustrated in FIG. 3, an area of the protection region PA when viewed from the front-rear direction D1 is larger than an area of a mounting region MA between the pair of side rails 5. When the pair of protection members 30 is not provided, the electric devices to be protected from the external impact F need to be mounted in the mounting region MA. On the other hand, by providing the pair of protection members 30, the electric devices to be protected from the impact F can be disposed in the protection region PA. Therefore, the space around the frame 2 can be effectively used.

As illustrated in FIG. 3, the pair of brake registers 4 is respectively disposed immediately below the pair of side rails 5. Note that the phrase "disposed immediately below the pair of side rails 5" means that a part or the whole of each of the brake registers 4 is disposed at a position overlapping each of the side rails 5 when viewed from below. The brake register 4 converts regenerative power generated by the motor 3 into thermal energy and consumes the thermal energy. When the vehicle 1 is a large vehicle, a large regenerative braking force is required due to a large vehicle weight. As a result, since the regenerative power generated by the regenerative brake also increases, the generated electric power may not be able to be stored in the battery 24. The brake register 4 consumes regenerative power that cannot be stored in the battery 24.

Figure 4:
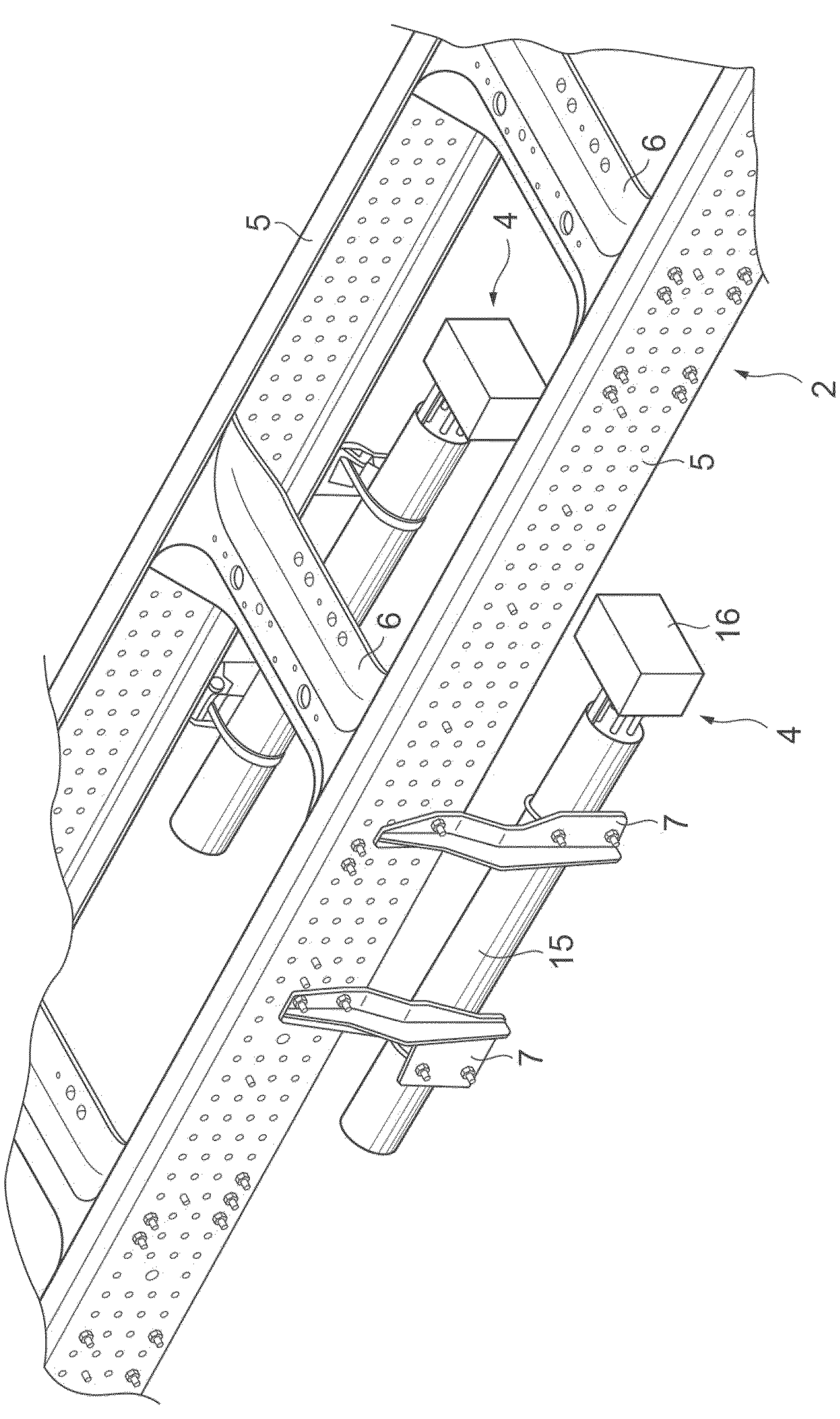
FIG. 4 is a perspective view illustrating a pair of brake registers.

The pair of brake registers 4 is fixed to the frame 2 by the pair of brackets 7. FIG. 4 is a perspective view illustrating an example of the pair of brake registers 4. As illustrated in FIG. 4, each of the brake registers 4 includes a cylindrical main body 15 extending in the front-rear direction D1 of the vehicle 1 and a circuit 16 that accommodates electronic components. The main body 15 accommodates a resistor and a refrigerant flow path. When electric power is supplied to the resistor in the main body 15, the resistor generates heat.

As illustrated in FIG. 4, the pair of brackets 7 extends in the vertical direction and holds the pair of brake registers 4 in a state of being suspended below the side rails 5. Specifically, upper portions of the pair of brackets 7 are fastened to outer surfaces of the pair of side rails 5 with fastening members such as bolts. Lower ends of the pair of brackets 7 are connected to the pair of brake registers 4 via U-shaped bolts.

As illustrated in FIG. 3, the pair of brake registers 4 are located immediately below the pair of side rails 5 and are held in spaces S formed between the pair of protection members 30, respectively, by the pair of brackets 7. The spaces S are a part of the protection region PA. Therefore, the pair of brake registers 4 is protected from the external impact F by the pair of protection members 30. Furthermore, the pair of brake registers 4 is separated from the pair of side rails 5 via a gap. Note that the pair of brake registers 4 is also separated from the pair of hydrogen tanks 25.

As described above, the pair of brake registers 4 is disposed in a state of being suspended immediately below the pair of side rails 5. Each of the spaces S below the pair of side rails 5 is a space through which traveling wind flows when the vehicle 1 travels. Therefore, the pair of brake registers 4 receives the traveling wind while the vehicle 1 is traveling. Due to the traveling wind, heat generated by the pair of brake registers 4 is discharged to the rear of the vehicle 1 without remaining in the spaces S. Therefore, the temperature around the pair of brake registers 4 is less likely to rise, and heating of the electric devices disposed around the pair of brake registers 4 is suppressed.

Figure 5:
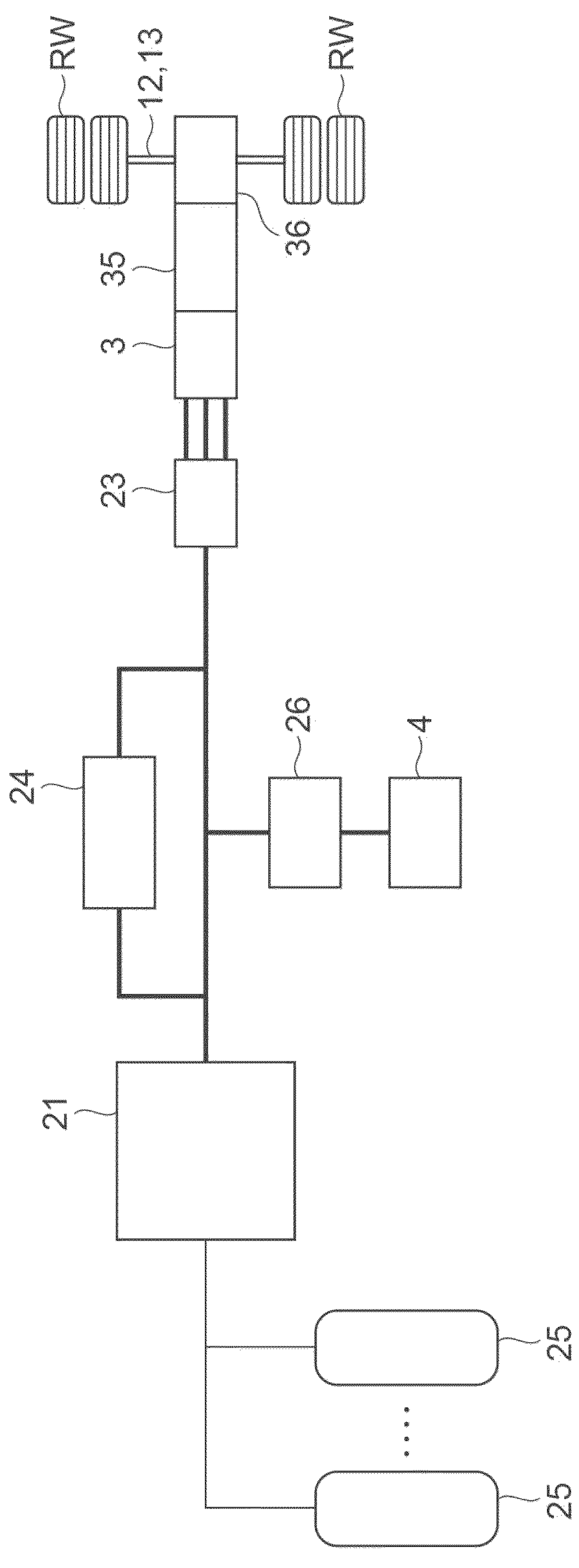
FIG. 5 is a diagram illustrating an example of an electrical connection configuration of a brake register.

The operation of the pair of brake registers 4 is controlled by the brake register controller 26. The brake register controller 26 switches each of the brake registers 4 between activation and deactivation. FIG. 5 illustrates an example of an electrical connection configuration of the brake register 4. Note that. in FIG. 5, the motor 3 is connected to the rear axle 12 or the rear axle 13 via a speed reducer 35 and a differential gear 36.

As illustrated in FIG. 5, the brake register 4 is electrically connected to the fuel cell stack 21, the inverter 23, and the battery 24 via the brake register controller 26. When there is a sufficient free capacity in the battery 24, the brake register controller 26 stops the activation of the brake register 4 at the time of regenerative braking. As a result, regenerative power generated by the motor 3 by regenerative braking is charged in the battery 24 via the inverter 23. On the other hand, when the battery does not have sufficient free capacity, the brake register controller 26 activates the brake register 4 at the time of regenerative braking. As a result, the extra regenerative power generated by the motor 3 by the regenerative braking is converted into heat and consumed.

In one embodiment, as illustrated in FIG. 3, a plurality of radiators 40 are provided outside the plurality of hydrogen tanks 25 in the vehicle width direction D2. The plurality of radiators 40 are supported by the outer erecting portion 33 of the protection member 30. In one embodiment, as illustrated in FIG. 1, the plurality of radiators 40 include a radiator 40*a* that cools the pair of brake registers 4, a radiator 40*b* that cools the high-voltage device 22, and a radiator 40*c* that cools the inverter 23 and the motor 3. The plurality of radiators 40 may further include a radiator 40*d* supported on the front portion of the frame 2. As illustrated in FIG. 1, among the plurality of radiators 40, the radiators 40*a* and 40*b* are disposed outside the pair of brake registers 4 in the vehicle width direction D2 when viewed from above.

When the outside air passes through each of the plurality of radiators 40, the radiator 40 radiates the heat of the refrigerant flowing inside thereof to the outside air to cool the refrigerant. The vehicle body lower structure 10 may include a plurality of radiator fans 41 that promote cooling of the refrigerant (see FIG. 6). The plurality of radiator fans 41 is provided, for example, between the plurality of radiators 40 and the hydrogen tank 25, and blow air to the hydrogen tank 25. Air flows directed from the plurality of radiators 40 to the hydrogen tank 25 are generated by air blowing from the plurality of radiator fans 41, and introduction of outside air into the plurality of radiators 40 is promoted.

A refrigerant flow path 42 for circulating a refrigerant is provided between the radiator 40*a* and the brake register 4. The refrigerant flow path 42 cools the brake register 4 by circulating the refrigerant between the brake register 4 and the radiator 40*a*. The refrigerant is, for example, cooling water.

Figure 6:
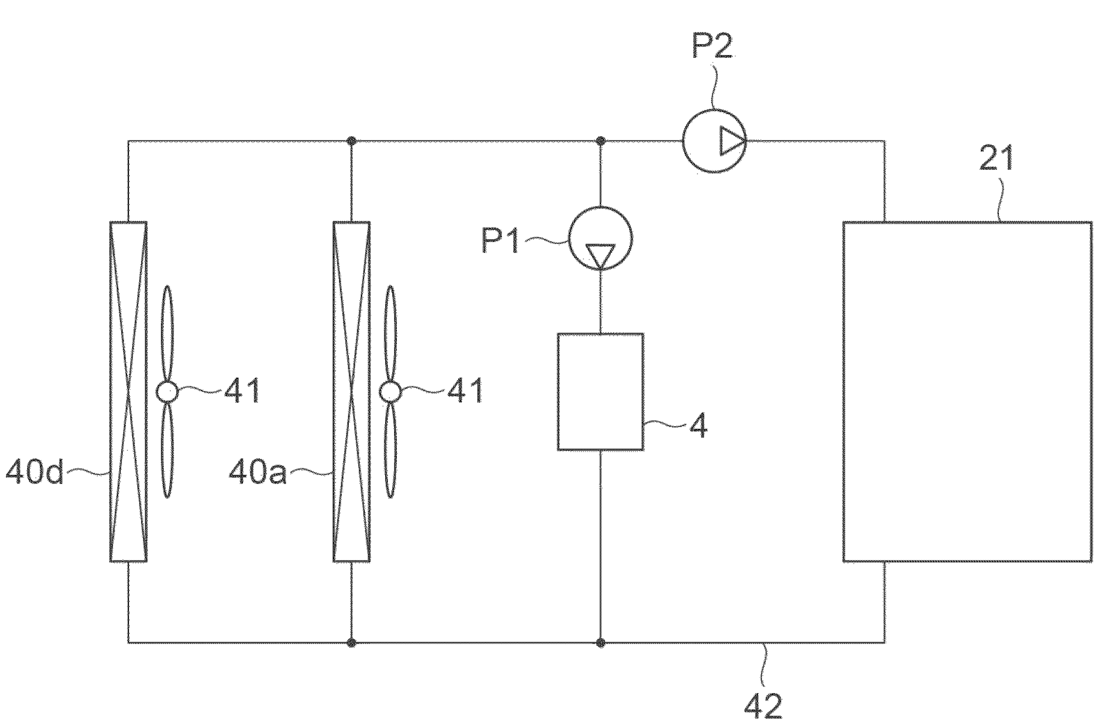
FIG. 6 is a diagram illustrating an example of a circulation path of a refrigerant.

FIG. 6 illustrates an example of a refrigerant circulation path. In the embodiment illustrated in FIG. 6, radiators 40*a* and 40*d*, the brake register 4, the fuel cell stack 21, and pumps P1 and P2 are connected to the refrigerant flow path 42. The brake register 4 is connected in parallel with the fuel cell stack 21.

As described above, the radiators 40*a* and 40*d* cool the refrigerant by heat exchange between the refrigerant and outside air introduced from the outside of the vehicle 1. The refrigerant cooled by the radiators 40*a* and 40*d* is supplied to the brake register 4 and the fuel cell stack 21 through the refrigerant flow path 42 to cool the brake register 4 and the fuel cell stack 21. The refrigerant that has absorbed the heat of the brake register 4 and the fuel cell stack 21 is returned to the radiators 40*a* and 40*d* and cooled again. That is, the refrigerant flow path 42 circulates the refrigerant between the radiator 40*a* and the brake register 4. As a result, the brake register 4 is cooled. Since the radiator 40*a* is disposed outside the pair of brake registers 4 in the vehicle width direction D2 when viewed from above, a length of the refrigerant flow path 42 between the radiator 40*a* and the pair of brake registers 4 can be shortened. Therefore, the pair of brake registers 4 can be efficiently cooled.

As described above, in the vehicle body lower structure 10 according to the embodiment, since the pair of brake registers 4 is disposed immediately below the pair of side rails 5 that receives the traveling wind when the vehicle 1 travels, the heat generated by the pair of brake registers 4 is released to the outside of the vehicle by the traveling wind. Therefore, it is possible to suppress an increase in the temperature around the pair of brake registers, and as a result, it is possible to suppress an adverse effect on the electric devices due to heat generation of the pair of brake registers 4. In particular, since the pair of brake registers 4 is separated from the pair of side rails 5 via the gap, it is possible to more reliably suppress an adverse effect on the electric devices mounted on the pair of side rails 5.

Although the vehicle body lower structure according to various embodiments has been described above, various modifications can be made without being limited to the above-described embodiments and without changing the gist of the disclosure. For example, in the above-described embodiment, the vehicle body lower structure 10 includes the pair of brake registers 4, but the vehicle body lower structure according to one embodiment may include only one brake register 4. In this case, the brake register 4 is disposed immediately below one of the pair of side rails 5.

Note that, although the vehicle 1 has been described as a fuel cell vehicle, the vehicle 1 may be a vehicle other than the fuel cell vehicle, such as a hybrid vehicle or an electric vehicle. The various embodiments described above can be combined as long as no contradiction occurs.

REFERENCE SIGNS LIST

1 vehicle
2 frame
3 motor
4 brake register
5 side rail
7 bracket
10 vehicle body lower structure
25, 25*a*, 25*b* hydrogen tank
30, 30*a*, 30*b* protection member
40, 40*a*, 40*b*, 40*c*, 40*d* radiator
42 refrigerant flow path
D1 front-rear direction
D2 vehicle width direction
F impact

What is claimed is:

1. A vehicle body lower structure comprising:
a frame including a side rail extending in a front-rear direction of a vehicle;
a motor configured to generate regenerative power;
a brake register configured to convert the regenerative power into thermal energy; and
a bracket connected to the side rail to hold the brake register in a state of being suspended below the side rail,
wherein the brake register is disposed immediately below the side rail so as to receive traveling wind while the vehicle is traveling, and
at least a part of the brake register overlaps with the side rail when viewed from below.

2. The vehicle body lower structure according to claim 1, further comprising:
a radiator disposed outside the brake register in a vehicle width direction when viewed from above the vehicle; and
a refrigerant flow path configured to circulate a refrigerant between the radiator and the brake register.

3. A vehicle body lower structure comprising:
a frame including a pair of side rails extending in a front-rear direction of a vehicle;
a motor configured to generate regenerative power;
a brake register configured to convert the regenerative power into thermal energy;
a pair of hydrogen tanks disposed in a vehicle width direction outside the pair of side rails; and a pair of protection members configured to respectively protect the pair of hydrogen tanks from external impact, wherein the brake register is disposed immediately below at least one of the pair of side rails so as to receive traveling wind while the vehicle is traveling, and the brake register is disposed between the pair of protection members.

* * * * *